United States Patent [19]

Wurzel

[11] 3,987,697
[45] Oct. 26, 1976

[54] FRICTION-GRIP SELF-LOCKING RETAINING RING AND SHAFT COMBINATION

[75] Inventor: Hugo Wurzel, New York, N.Y.

[73] Assignee: Waldes Kohinoor, Inc., Long Island City, N.Y.

[22] Filed: Mar. 10, 1975

[21] Appl. No.: 556,927

Related U.S. Application Data

[63] Continuation of Ser. No. 374,489, June 28, 1973, abandoned.

[52] U.S. Cl. .................................................. 85/8.8
[51] Int. Cl.² ........................................ F16B 21/00
[58] Field of Search .................. 85/8.8, 8.6, 51, 36; 151/69; 403/DIG. 7, 254

[56] References Cited

UNITED STATES PATENTS

| 2,491,310 | 12/1949 | Heimann | 85/8.8 |
| 2,574,034 | 11/1951 | Heimann | 85/36 |
| 2,595,787 | 5/1952 | Heimann | 287/DIG. 7 |
| 2,755,698 | 7/1956 | Wurzel | 85/8.8 |
| 2,886,355 | 5/1959 | Wurzel | 85/8.8 X |

FOREIGN PATENTS OR APPLICATIONS

| 886,005 | 1/1962 | United Kingdom | 85/8.8 |

Primary Examiner—Ramon S. Britts
Attorney, Agent, or Firm—J. Harold Kilcoyne

[57] ABSTRACT

The combination of a grooveless cylindrical shaft-form member and an open-ended friction-grip ring of the external form and of the general type disclosed in Heimann U.S. Pat. No. 2,574,034, dated Nov. 16, 1951, but which rather than being designed to grip the shaft surface on which it is assembled all around its arcuate inner edge, as per said Heimann patent, is instead provided with illustratively three inner-edge planar prongs whose inner ends or tips lie on a circle which is concentric with the circle of the outer-edge circle of the ring body and which is eccentric by a predetermined amount to the inner edge of said ring body, such eccentricity being in the direction of the ring ends. One said prong extends inwardly from the middle section of the ring body having maximum section height and two of said prongs extends inwardly from end sections of the ring body having minimum section height. Further, the circle on which all the prong tips lie is slightly smaller by a predetermined amount than the circle of the shaft.

2 Claims, 4 Drawing Figures

FRICTION-GRIP SELF-LOCKING RETAINING RING AND SHAFT COMBINATION

CROSS-REFERENCE TO RELATED APPLICATION

This application is a continuation of my now abandoned application Ser. No. 374,489 filed June 28, 1973.

INTRODUCTION

This application relates to improvements in grooveless cylindrical shaft-form member and self-locking retaining ring combinations and, as an essential element thereof, to a self-locking retaining ring of an improved design enabling rings constructed in accordance therewith effectively to grip and self-lock themselves to the external (cylindrical) surface of small-diameter shafts, spindles, pins and like carrier members at preferably three spaced points along their arcuate length rather than self-locking to said surface all around the ring inner edges as heretofore.

BACKGROUND OF THE INVENTION

Artificial shoulder-forming retaining rings designed to self-lock themselves solely by friction to the external surfaces of (grooveless) carrier members such as shafts, especially small-diameter shafts, spindles, rods, pins, etc., are well known, having been disclosed and claimed in U.S. Patent to Heimann U.S. Pat. No. 2,574,034 dated Nov. 16, 1951. According to said patent, rings of this type are calculated so that their maximum section height will provide maximum gripping pressure uniformaly all around their inner edges when spread within their elastic limit to the diameter of the shaft and assembled thereon.

Since the thrust resistance capable of being provided by said rings with respect to machine parts to be located or positioned thereby is equal to the aforementioned gripping pressure times the friction coefficient of the inner circumferential ring-edge with the surface of the shaft, it becomes obvious that in shaft-ring combinations constructed according to the prior designs the outer dimensions of the self-locking rings are limited by the distance of the shaft surface from the outer edge of the ring at the point of its maximum section height. Such a limitation becomes extremely critical in the case of small shafts of 1/16 inch diameter and even less. Further, because of manufacturing tolerances, continuing experience with rings of such small sizes constructed according to the patened design has shown that their performance is somewhat irregular and to a degree unreliable. Additionally, the production of such small rings according to the known self-locking design has been proven to be very expensive.

OBJECTS OF THE INVENTION

Stated broadly, the objects and aims of the invention are summarized as follows:

a. The provision of a groovelss cylindrical shaft-form member and retaining-ring combination characterized by a friction-grip self-locking retaining ring forming an essential element thereof having effectively larger outer diameter than possible with any self-locking rings of the prior design or designs, with the desirable result that said ring element of the invention is capable of forming a shoulder on a shaft, pin and the like of substantially greater height than the known friction-grip, self-locking rings;

b. The provision of a grooveless cylindrical shaft-form member and friction-grip self-locking retaining ring combination as last aforesaid characterized by the feature of said ring element having a larger outer-diameter which may be considered as struck from a center coinciding substantially with the shaft center, such being a desirable feature in many ring assemblies and in instances where the supply of rings in the form of tape-wrapped or banded packages for automatic dispensing is more or less mandatory;

c. The provision of a friction-grip self-locking retaining ring element for the combination as stated which is so designed as to give larger maximum section heights than heretofore, a highly advantageous and desirable feature when it is considered that the larger the section height the greater the grip pressure capable of being applied to the shaft surface, as follows from the formula that ring pressure on shaft is proportional to the square of ring section height;

d. The provision of an inner prong-type self-locking retaining ring for said combination wherein the pressure exerted by the ring against the shaft surface is concentrated at preferably three points of said surface as distinguished from being applied through the arcuate inner edge of the ring body;

e. The provision, as an essential element of the aforesaid combination, of an inner prong-type self-locking retaining ring having a greater friction coefficient and hence a corresponding larger thrust resistance than any known friction-grip self-locking retaining ring when assembled on shafts of the same diameter;

f. The provision of a friction-grip self-locking retaining ring constituting an essential element of the aforesaid combination, which is designed to be prestressed, that is to say, its effective inner diameter as manufactured may be made small by an amount such the the ring in its first assembly takes on a permanent set or, in other words, is prestressed to a degree producing residual stresses in the ring body which increase the maximum stress in the ring and thereby results in a further increase in its thrust resistance; and g. The provision of a friction-grip self-locking retaining ring of a design allowing the production of such rings at reasonable cost for small-diameter shaft-ring combinations, i.e. for shafts smaller than 1/16 inch diameter, with such ring having gap configuration suited to conventional ring-assembly tools.

SUMMARY OF THE INVENTION

The aforesaid objects of the invention have been effectively achieved by a retaining ring component in the form of a planar open-ended annulus of spring metal having section heights which decrease progressively from the ring-body middle section towards its open ends, whereby said ring body is capable of maintaining substantial circularity when spread over a shaft within the elastic limit (yield strength) of the spring metal from which it is fashioned and which, rather than relying on a continuous gripping edge as was heretofore conventional, is instead provided in its fabrication with three (illustratively) planar prongs which extend radially inwardly from the ring-body inner edge by amounts such that the free ends or tips of said prongs lie on a circle whose diameter is 2 – 6% less than the diameter of the shaft for which the ring is designed, and which circle is concentric with the outer-edge circle of the ring body, the diameter of which latter (outer edge) circle being 5 times to 2½ times the diameter of the prong-tip circle, depending on design requirements, allowable stresses, etc..

A third diameter characterizing the improved ring design of the invention is that of the circle of said inner edge of the ring body, which circle is eccentric to the outer-edge circle as results in the ring body being "tapered" as above, the eccentricity of the inner circular edge to outer circular edge being along the vertical center line of said ring body passing through the gap between its open ends and in the direction of said gap. Thus, the tapered ring body of the invention has maximum section height at its middle section and minimum section height (which is about half that of its maximum section height) adjacent its open ends. Also, the neutral diameter of the body of the ring element of the invention is about 3–5 times its aforesaid maximum height, with the smaller-size rings and the rings with lesser deflection requirements having the larger neutral diameters.

Illustratively, the aforesaid inner-edge prongs are three in number and are disposed one to project into the ring-annulus opening from the ring middle-section having maximum section height (said one prong having predetermined minimum radial length), the remaining two prongs projecting into the ring opening from section heights disposed symmetrically just to the sides of the ring-body gap, said two prongs having equal radial length which is greater than that of said one prong by an amount as to dispose their tip ends on the circle containing the tip end of said one prong, which circle is concentric with the circle of the outer edge of the ring body.

Thus, when a ring of the new design is assembled on a shaft of the size for which it is suited, its inner-edge planar prongs exert a gripping pressure in inward direction on the shaft surface at the three spaced-apart points thereof contacted by the prong tips, which is fully effective to self-lock the ring to said surface. Also, when so assembled, the outer circle of the ring will be concentric with the shaft circle and the shoulder provided by the ring will have substantially greater height than the shoulder height capable of being provided by any of the known self-locking rings which grip the shaft all around their inner edges.

DETAILED DESCRIPTION OF THE INVENTION

Figure 1:
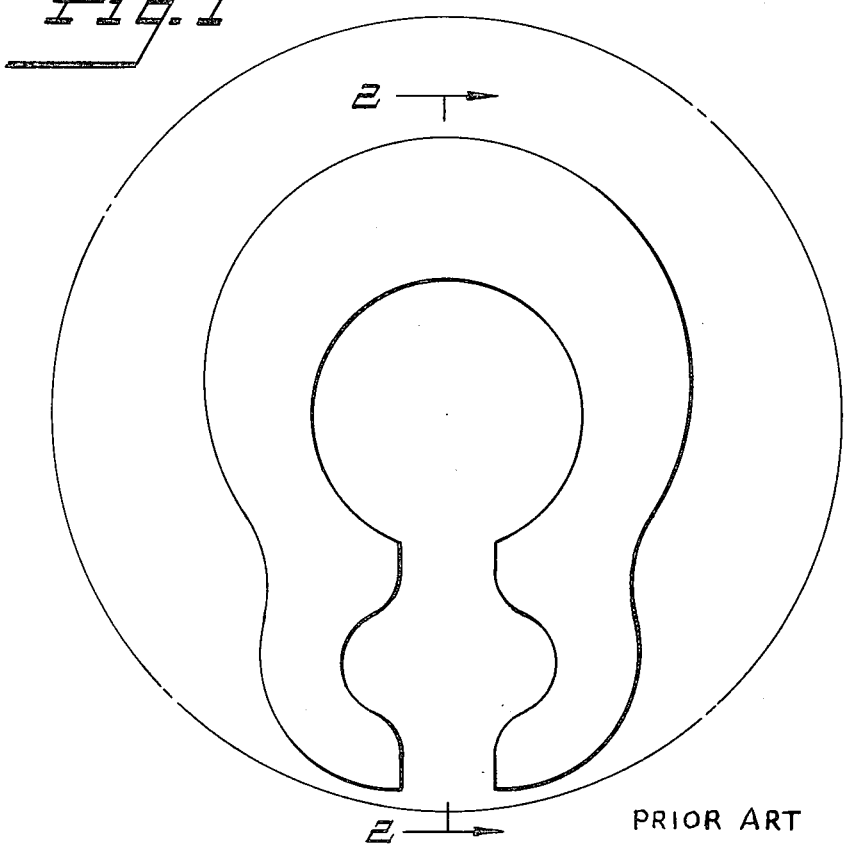
FIG. 1 is an end elevational view of the prior art.
Figure 2:
FIG. 2 is a cross-sectional view along the vertical center line of FIG. 1 taken in the direction of arrows 2—2.
Figure 3:
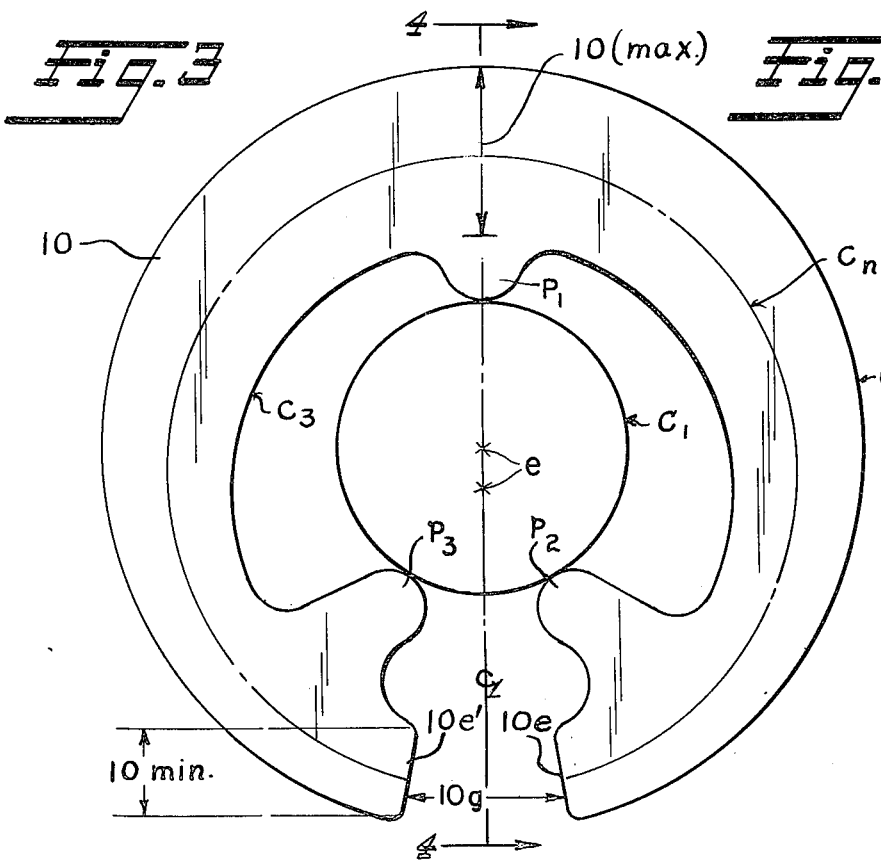
FIG. 3 is an end elevational view of the present invention installed on a shaft.
Figure 4:
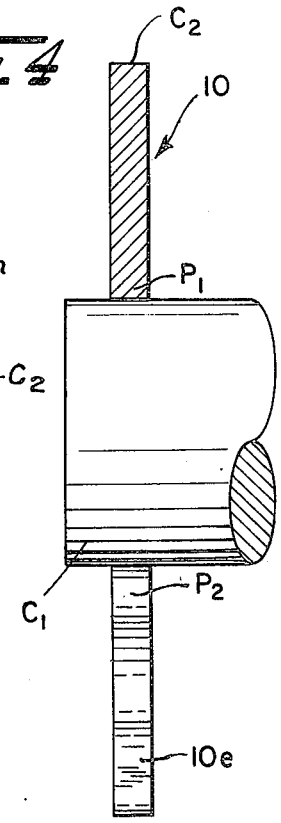
FIG. 4 is a cross-sectional view of the present invention along the vertical center line of FIG. 3 taken in the direction of arrows 4—4.

An improved inner prong-type, friction-grip self-locking retaining ring constituting an essential element of the grooveless shaft-ring combination of the invention is illustratively shown in FIGS. 3 and 4 of the appended drawing against the background of a prior art friction-grip self-locking retaining ring according to FIGS. 1 and 2, which latter follows the FIG. 5 form of ring of the aforementioned patent to Heimann U.S. Pat. No. 2,574,034 of 1951. More particularly, reference numeral 10 (FIGS. 3 and 4) designates an open-ended (sometimes also termed a "split") tapered ring body of spring metal having gradually decreasing section heights from its middle or center-line section designated $10_{(max)}$ to near its open ends $10e$, $10e'$, which latter are spaced apart by a relatively narrow-width gap $10g$. Thus, the tapered ring body is adapted to maintain its circularity when spread within the elastic limit (yield strength) of the spring metal from which it is fashioned and subsequently released. Being designed to self-lock itself to a shaft surface at three spaced points along its arcuate length solely by friction when spread over a shaft and so released, the improved ring of the invention, in contrast to the patented friction-grip self-locking ring which grips to the shaft surface all around its inner edge, is fashioned with, illustratively, three planar inner-edge prongs $p_1$, $p_2$ and $p_3$ of radial length such that their tip or free ends only, which latter are sharply radiused as shown so as to make point contact and engage and grip to the shaft surface with sufficient radially-inward force as to self-lock the ring thereto.

Referring to FIG. 3, it is a further feature of the invention that said inner-edge prongs have radial lengths such that their free or tip ends lie on a circle $C_1$ having diameter which is 2 – 6% less than the diameter of the circle of the grooveless shaft on which the ring is assembled, and which circle concentric with the circle $C_2$ of the outer edge of the ring body, the diameter of which is 5 times – 2½ times that of said circle $C_1$.

FIG. 3 also illustrates that the inner-edge circle $C_3$ of the ring body proper is eccentric to the circle $C_2$ of the ring outer-edge, the eccentricity which is designated $e$ in said figure being along the vertical center line $C_L$ passing through the ring gap $10g$ and in the direction of said ring gap. Thus, consequent to this eccentricity $e$, the ring body has maximum section height at its middle section designated $10_{(max)}$ and minimum section height adjacent its ends $10e$ and $10e'$.

Illustratively, the aforementioned inner-edge prongs $p_1$, $p_2$ and $p_3$ are disposed about the ring inner-edge as follows: the prong $p_1$ projects from the ring-body inner edge and into the ring opening from the ring middle-section having maximum section height and the prongs $p$ and $p$ project from the ring-body inner edge and into the ring opening from ring-body end-sections having minimum section height. To insure that the ring when assembled on a grooveless shaft for which it was designed will provide an abutment shoulder of substantial height all around its arcuate length, despite the "tapered" ring body, the middle-section prong $p_1$ has the least radial length and the end prongs $p_2$ and $p_3$ have equal radial length greater than the radial length of the middle prong $p_1$ by an amount such that all three prong tips will lie on the aforesaid circle $C_1$.

As with the self-locking ring of the FIG. 5 form of the aforementioned Heimann patent (herein FIGS. 1 and 2), the gap-defining edges of the ring ends $10e$ and $10e'$ are preferably fashioned with facing, substantially semi-circular recesses dimensioned for the reception of tool means capable of spreading the ring body the small amount requisite to its assembly on and disassembly from the shaft for which it was designed.

From the foregoing, it will be appreciated that the height of the shoulder capable of being provided by a ring of the invention is the sum of the section height of the ring body at its middle section $10_{(max)}$, plus the radial length of the middle prong $p_1$ which projects therefrom, plus the small increment in ring outer-edge diameter which the ring body takes on when spread over a shaft having the slightly greater diameter than that of the aforesaid circle $C_1$. It will be appreciated further that the aforesaid shoulder height obtains throughout the full arcuate length of the ring body of the invention, consequent to the radial length of the end prongs $p_2$ and $p_3$, being such as dispose their free or tip ends on the aforesaid circle $C_1$ on which the free end or tip of the shorter prong $p_1$ also lies.

A desirable feature of the present ring design is that its ring body can be fashioned so as to be prestressed, i.e. so dimentioned that during the course of its first assembly it takes on a slight permanent set as engenders residual stresses in the ring body which increase the maximum gripping force capable of being exerted by the ring on its shaft and its resistance to thrust exerted thereon by machine part for which the ring is designed to serve as an artificial shoulder.

Without further analysis, it will be apparent that when a ring of the improved design, in the course of its assembly on a smooth-surface shaft, is spread over said shaft an released thereto, the inner-edge prongs $p_1$, $p_2$ and $p_3$ thereof will transmit the pressure developed within the ring body, consequent to its being spread, to the tips of said prongs in terms of a friction gripping force; and since the amount of the aforesaid spreading is substantially of the same order of magnitude as that of a ring which friction-grips its shaft all around its inner edge, the pressure so transmitted via the inner-edge prongs and the friction-gripping force exerted by the prong tips on the shaft surface can be calculated by the same basic formulae as set forth in the aforementioned Heimann patent and which, for simplicity of the present disclosure, is not repeated here.

I claim:

1. The combination of a grooveless cylindrical shaft-form member and an open-ended retaining ring self-locked at three spaced points along its arcuate length solely by friction to the external surface of said member at a desired location therealong thereby providing an artificial machine-part retaining and/or locating shoulder projecting radially from said surface, said retaining ring comprising a planar open-ended annular ring body of psring metal whose outer edge extends along the major arc of a circle which is concentric with and whose diameter is approximately 2½–5 times the diameter of the circle defined by the cross-section of said cylindrical shaft-form member and whose inner edge is eccentric to said outer edge in direction such that the ring-body section heights decrease progressively from its middle section to near its open ends, and said ring body being provided along its said inner edge with three prongs which project radially inwardly from said annular ring-body proper into the ring-body opening, one said prong projecting from the ring-body middle section and the two remaining prongs projecting from the ring-body end sections, said prongs terminating at their inner ends in sharply radiused tips frictionally gripping said shaft-form member in point contact, and the radial length of said prongs causing said tips to grip the cylindrical surface of said shaft-form member with such force as to self-lock said retaining ring solely by said frictional grip to said external surface.

2. The combination as set forth in claim 1, wherein said shaft-form member has a diameter of the order of 1/16 inch.

* * * * *